US012444555B2

(12) United States Patent
Huang et al.

(10) Patent No.: US 12,444,555 B2
(45) Date of Patent: Oct. 14, 2025

(54) MECHANICAL KEYBOARD

(71) Applicant: Primax Electronics Ltd., Taipei (TW)

(72) Inventors: Shu-An Huang, Taipei (TW); Kai-Wen Lee, Taipei (TW); Sheng-An Tsai, Taipei (TW); Li-Kuei Cheng, Taipei (TW); Tsun-Han Wu, Taipei (TW); Chen-Wei Chan, Taipei (TW); Shao-Ju Yen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 247 days.

(21) Appl. No.: 18/507,828

(22) Filed: Nov. 13, 2023

(65) Prior Publication Data

US 2025/0125106 A1 Apr. 17, 2025

(30) Foreign Application Priority Data

Oct. 13, 2023 (CN) ......................... 202311328928.8

(51) Int. Cl.
*H01H 13/84* (2006.01)

(52) U.S. Cl.
CPC ......... *H01H 13/84* (2013.01); *H01H 2221/04* (2013.01)

(58) Field of Classification Search
CPC ...... H01H 13/84; H01H 2221/04; H01H 3/12; H01H 13/14; H01H 13/70
See application file for complete search history.

(56) References Cited

U.S. PATENT DOCUMENTS 8,232,494 B2 * 7/2012 Purcocks ........... H01H 13/7065 335/205
11,670,469 B1 * 6/2023 Chang .................... H01H 13/81 200/5 A

* cited by examiner

*Primary Examiner* — Lheiren Mae A Caroc
(74) *Attorney, Agent, or Firm* — KIRTON McCONKIE; Evan R. Witt

(57) ABSTRACT

A mechanical keyboard is provided, which includes a plurality of mechanical keys, a circuit board, a plurality of first magnetic elements, a lower casing and a plurality of second magnetic elements. The mechanical keyboard has a key region and an edge region surrounding the key region. The mechanical keys are located in the key region. The circuit board is disposed beneath the mechanical keys. The first magnetic elements are disposed beneath the circuit board and distributed in the key region. The lower casing is disposed beneath the mechanical keys, the circuit board and the first magnetic elements. The second magnetic elements are disposed over the lower casing, in which the second magnetic elements respectively correspond to the first magnetic elements and respectively repel the first magnetic elements.

11 Claims, 7 Drawing Sheets

MECHANICAL KEYBOARD

FIELD OF THE INVENTION

The present disclosure relates to a mechanical keyboard.

BACKGROUND OF THE INVENTION

An existing mechanical keyboard has a plurality of keys fixed on a circuit board. When a user presses any of the keys, a corresponding electrical signal is generated and transmitted to a controller through the circuit board to perform a specific function. However, the mechanical keyboard exhibits a rigid pressing feel. Although a cushioning material is provided between a positioning plate and a circuit board of some mechanical keyboards to produce a slightly elastic feel when the key is pressed, such elastic feel still needs to be improved.

SUMMARY OF THE INVENTION

The present disclosure provides a mechanical keyboard, which includes a plurality of mechanical keys, a circuit board, a plurality of first magnetic elements, a lower casing, and a plurality of second magnetic elements. The mechanical keyboard has a key region and an edge region surrounding the key region. The mechanical keys are located in the key region. The circuit board is disposed beneath the mechanical keys. The first magnetic elements are disposed beneath the circuit board and distributed in the key region. The lower casing is disposed beneath the mechanical keys, the circuit board and the first magnetic elements. The second magnetic elements are disposed over the lower casing, in which the second magnetic elements respectively correspond to the first magnetic elements and respectively repel the first magnetic elements.

In some embodiments of the present disclosure, there is no magnetic element located in the edge region.

In some embodiments of the present disclosure, vertical projections of the first magnetic elements are staggered from vertical projections of the mechanical keys, and the vertical projection of at least one of the first magnetic elements is between the vertical projections of two of the mechanical keys.

In some embodiments of the present disclosure, the first magnetic elements are fixed on a lower surface of the circuit board.

In some embodiments of the present disclosure, the mechanical keyboard further includes a cover body disposed between the circuit board and the lower casing, and fixed on a lower surface of the circuit board, in which the cover body has a plurality of first recesses respectively accommodating the first magnetic elements.

In some embodiments of the present disclosure, the cover body is a cover layer or is composed of a plurality of cover portions.

In some embodiments of the present disclosure, the cover body is composed of the cover portions, and each of the cover portions has one of the first recesses.

In some embodiments of the present disclosure, an open end of each of the first recesses faces the circuit board.

In some embodiments of the present disclosure, one of the mechanical keys has a positioning portion protruding downward from a lower surface of the mechanical key, and the circuit board has a first opening, and the positioning portion is through the first opening, and the cover body further has a second recess accommodating an end of the positioning portion.

In some embodiments of the present disclosure, the mechanical keyboard further includes an acoustic material disposed in the second recess and in contact with the positioning portion.

In some embodiments of the present disclosure, at least one of the first magnetic elements and the second magnetic elements is an electromagnet.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
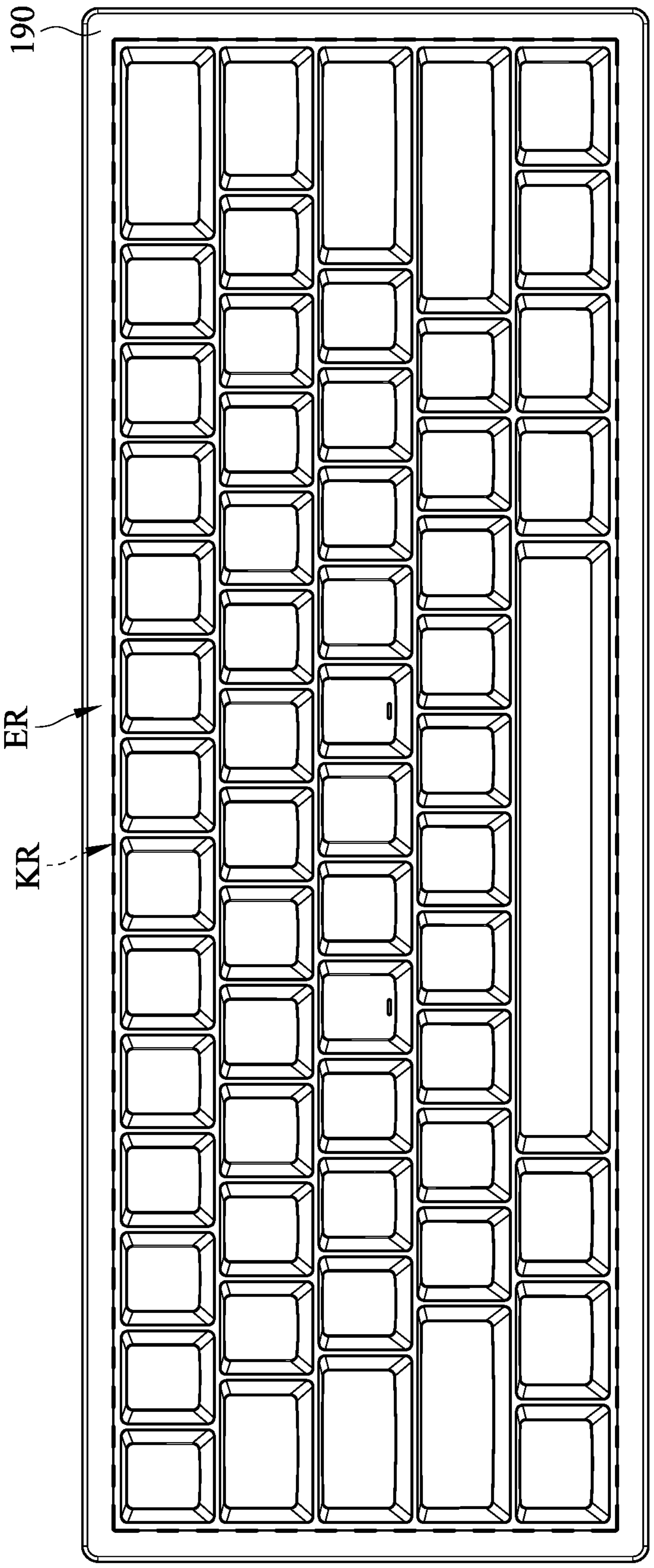
FIG. 1 is a schematic top view of a mechanical keyboard according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, the mechanical keyboard exhibits the rigid pressing feel. Although the cushioning material is provided between the positioning plate and the circuit board of some mechanical keyboards to produce the slightly elastic feel when the key is pressed, such elastic feel still needs to be improved. Accordingly, the present invention provides a mechanical keyboard, which includes a plurality of mechanical keys, a circuit board, a plurality of first magnetic elements, a lower casing, and a plurality of second magnetic elements. The first magnetic elements are disposed beneath the circuit board and distributed in the key region, and the second magnetic elements are disposed over the lower casing and respectively correspond to the first magnetic elements and respectively repel the first magnetic elements. Repulsive force between the first magnetic elements and the second magnetic elements can provide a keyboard module (at least including the mechanical keys, the circuit board and the first magnetic elements) with sufficient rebound force, and thus the keyboard module has uniform and good rebound performance. Various embodiments of the mechanical keyboard of the present invention will be described in detail below.

Figure 2:
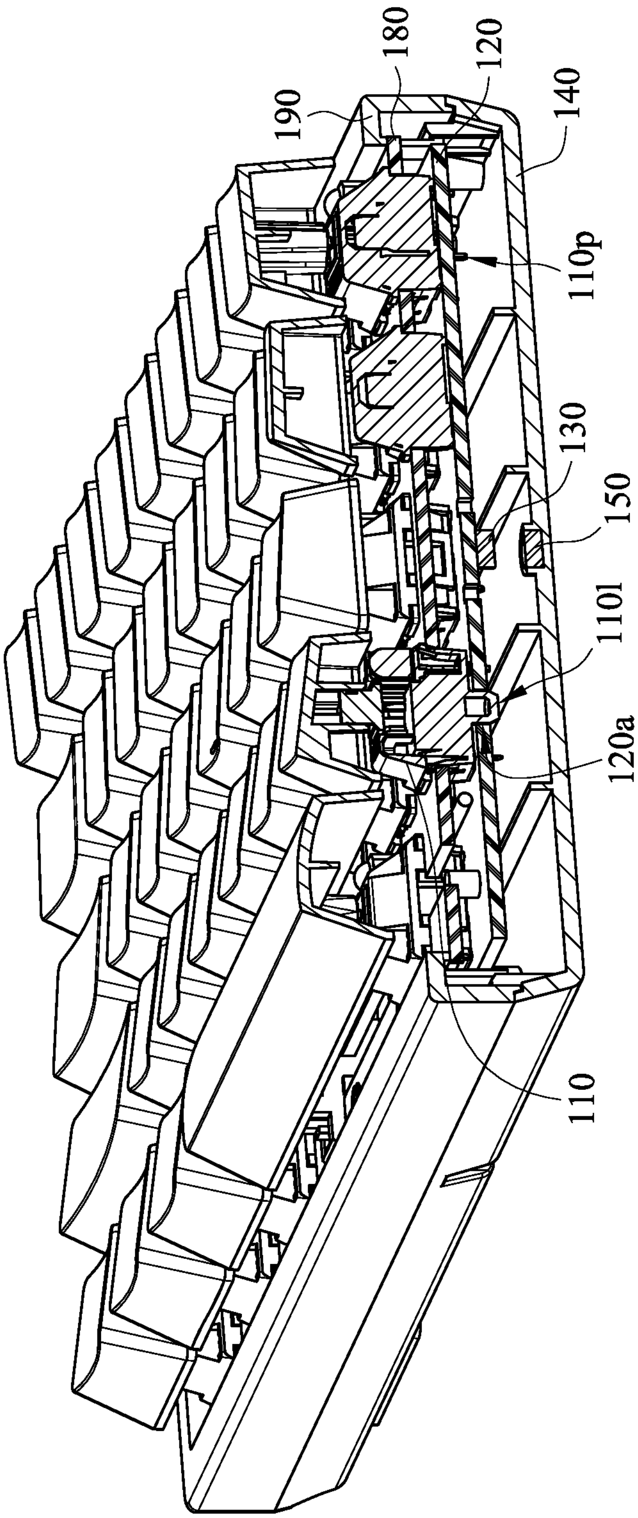
FIG. 2 is a schematic cross-sectional view of a mechanical keyboard according to an embodiment of the present invention.
Figure 3:
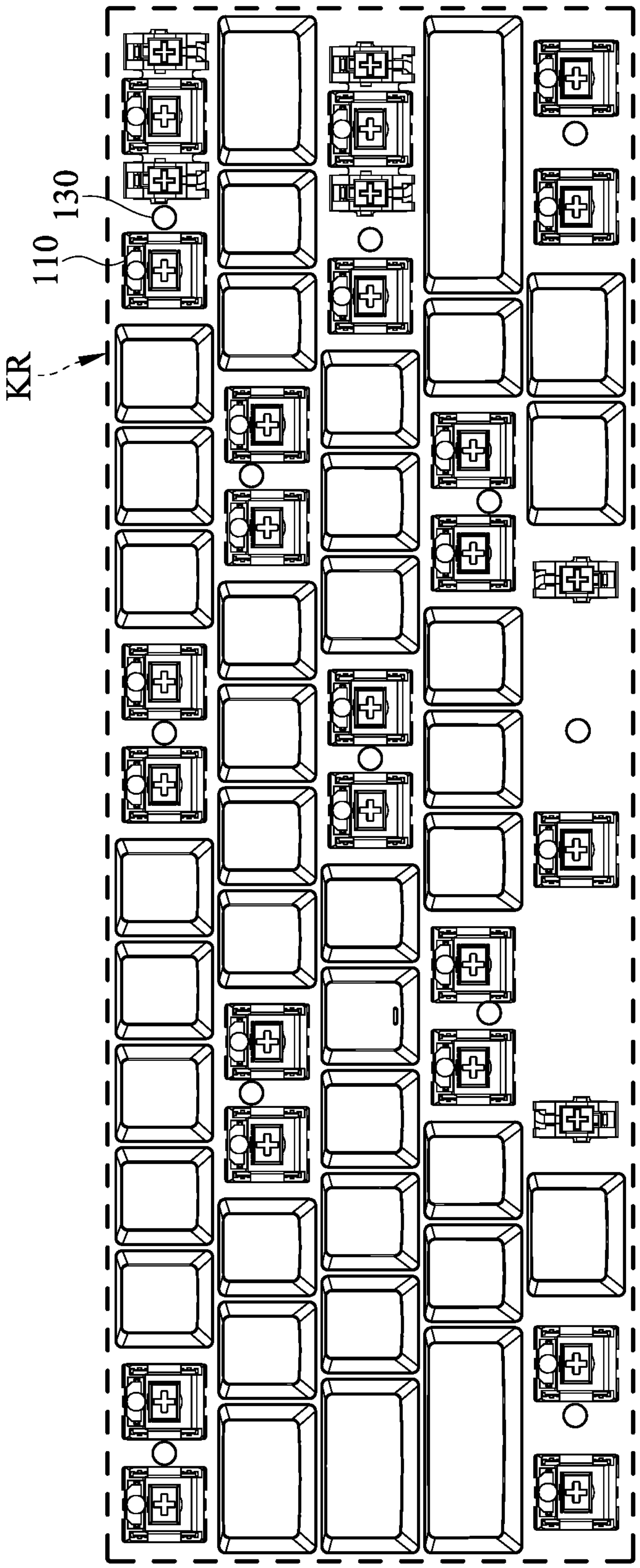
FIG. 3 is a schematic top view of a mechanical key and a first magnetic element according to an embodiment of the present invention.

FIG. 1 is a schematic top view of a mechanical keyboard according to an embodiment of the present invention. FIG. 2 is a schematic cross-sectional view of a mechanical keyboard according to an embodiment of the present invention. FIG. 3 is a schematic top view of a mechanical key and a first magnetic element according to an embodiment of the present invention. As shown in FIG. 1, the mechanical keyboard has a key region KR and an edge region ER, and the edge region ER surrounds the key region KR. As shown in FIGS. 1 to 3, the mechanical keyboard includes a plurality of mechanical keys 110, a circuit board 120, a plurality of first magnetic elements 130, a lower casing 140 and a plurality of second magnetic elements 150 (FIG. 2 shows one of the second magnetic elements 150). In some embodiments, there is no magnetic element located in the edge region ER.

As shown in FIGS. 1 to 3, the mechanical keys (or can be called shafts) 110 are located in the key region KR. Each of the mechanical keys is an independent switch and has an independent mechanical structure. In some embodiments, as shown in FIG. 2, one or each of the mechanical keys 110 has a positioning portion 1101 protruding downward from a lower surface of the mechanical key 110. In some embodiments, one or each of the mechanical keys 110 has one or more pins 110*p* protruding downward from the lower surface of the mechanical key 110 and separated from the positioning portion 1101. In some embodiments, the mechanical keyboard further includes a positioning plate 180, which is configured to support and fix the mechanical keys 110.

As shown in FIG. 2, the circuit board 120 is disposed beneath the mechanical keys 110. In some embodiments, the circuit board 120 has a first opening 120*a*, and the positioning portion 1101 of the mechanical key 110 is through the first opening 120*a*. The mechanical key 110 is fixed on the circuit board 120 through the positioning portion 1101. In some embodiments, the circuit board 120 further has a second opening (not shown) corresponding to the pin 110*p*, and the pin 110*p* is through the second opening.

As shown in FIGS. 2 and 3, the first magnetic elements 130 are disposed beneath the circuit board 120 and distributed in the key region KR. In some embodiments, the first magnetic elements 130 are fixed on a lower surface of the circuit board 120. As shown in FIG. 3, vertical projections of the first magnetic elements 130 are staggered from vertical projections of the mechanical keys 110. In some embodiments, please refer to FIGS. 2 and 3, the vertical projections of the first magnetic elements 130 are separated from vertical projections of the positioning portions 1101 of the mechanical keys 110 and vertical projections of the pins 110*p* of the mechanical keys 110. In some embodiments, as shown in FIG. 3, the vertical projection of at least one of the first magnetic elements 130 is between the vertical projections of two of the mechanical keys 110.

As shown in FIG. 2, the lower casing 140 is disposed beneath the mechanical keys 110, the circuit board 120 and the first magnetic elements 130. In some embodiments, the mechanical keyboard further includes an upper casing 190, and the upper casing 190 and the lower casing 140 jointly accommodate the mechanical keys 110, the circuit board 120, the first magnetic elements 130, the second magnetic elements 150 and the positioning plate 180. In some embodiments, as shown in FIG. 1, the edge region ER is composed of four edges of the upper casing 190.

The second magnetic elements 150 (FIG. 2 shows one of the second magnetic elements 150) are disposed over the lower casing 140 and respectively correspond to the first magnetic elements 130. In some embodiments, the lower casing 140 has a plurality of grooves (FIG. 2 shows one of the grooves), and the second magnetic elements 150 are respectively disposed in the grooves. In practical applications, size, quantity and distribution position of the first magnetic elements 130/the second magnetic elements 150 can be appropriately adjusted according to actual needs, so that the floating keyboard module of the present invention (at least including the mechanical keys 110, the circuit board 120 and the first magnetic elements 130) are supported by sufficient upward repulsive force.

In some embodiments, at least one (or more) of the first magnetic elements 130 and the second magnetic elements 150 is an electromagnet.

As such, magnetic field strength of the electromagnet can be adjusted by adjusting a current to adjust the repulsive force between the electromagnet and the corresponding magnetic element, thereby adjusting elastic strength of the floating keyboard module of the present invention.

It is worth noting that the first magnetic element 130 of the present invention is disposed beneath the circuit board 120, and a distance between it and the second magnetic element 150 is very small (several millimeters, for example, less than or equal to 2 millimeters, or even less than or equal to 1 millimeter), and the repulsive force therebetween is great accordingly, so after the key is pressed, the keyboard module rebounds quickly after moving downward for a very short distance. Therefore, the keyboard module exhibits good rebound performance and good use feel. If the first magnetic element is disposed at other positions, for example, disposed over the positioning plate 180 or between the positioning plate 180 and the circuit board 120, a distance between it and the second magnetic element 150 is greater, and the repulsive force therebetween is weaker accordingly, so after the key is pressed, the keyboard module rebounds after moving downward for a longer distance. Therefore, the keyboard module exhibits weak rebound performance and poor use feel.

In another aspect, since the first magnetic elements 130 and the second magnetic elements 150 of the present invention are distributed in the key region KR, no matter which one or more of the keys are pressed, the repulsive force between the first magnetic elements 130 and the second magnetic element 150 near the one or more of the keys can provide sufficient rebound force to the keyboard module, so the keyboard module exhibits uniform rebound performance. If the first magnetic elements and the second magnetic elements are only distributed in the edge region ER, only the edge region ER of the keyboard module can provide rebound force, which causes pressing feel of a key close to the edge region ER to be different from pressing feel of a key far away from the edge region ER (e.g., located in a center region of the key region KR), so the keyboard module fails to exhibit uniform rebound performance.

Figure 4:
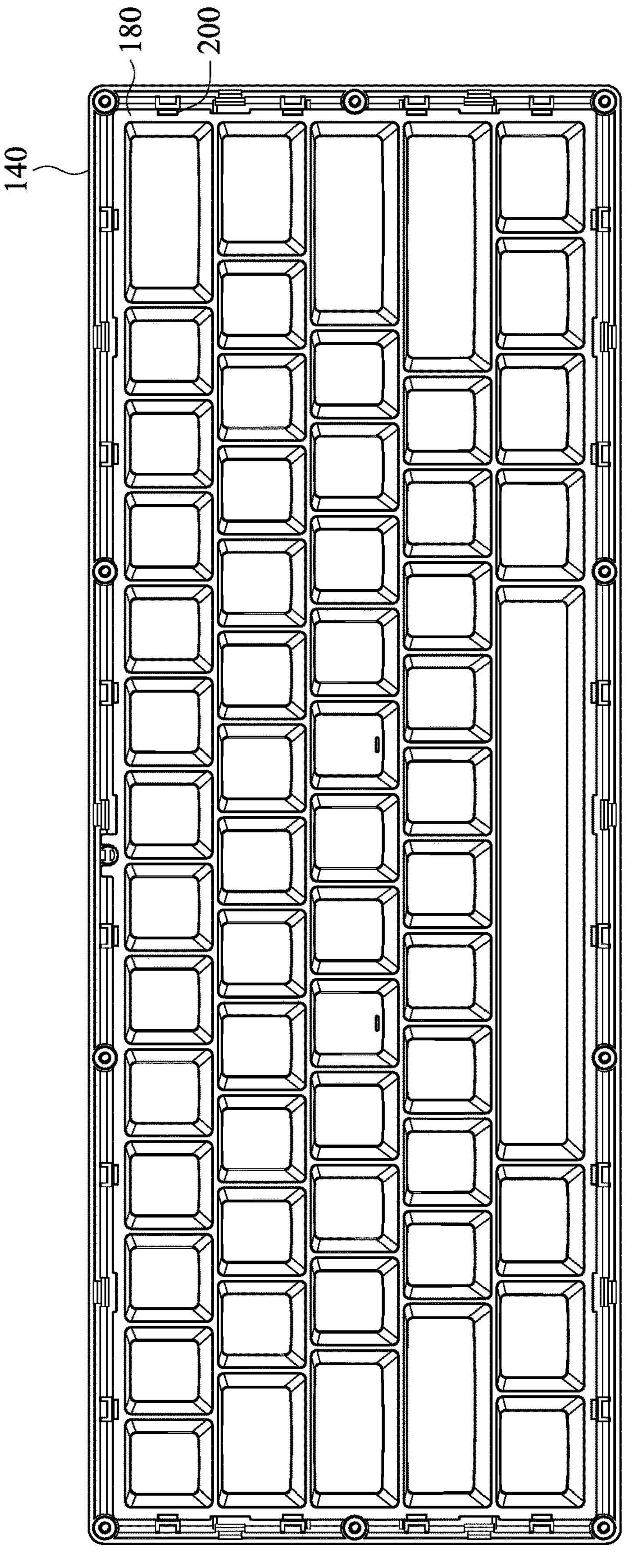
FIG. 4 is a schematic top view of a mechanical keyboard (an upper casing is not shown) according to an embodiment of the present invention.

FIG. 4 is a schematic top view of a mechanical keyboard (an upper casing is not shown) according to an embodiment of the present invention. Please refer to FIGS. 1 and 4. In some embodiments, the mechanical keyboard further includes a cushioning material 200 disposed between the positioning plate 180 and the upper casing 190. When the key is pressed, the keyboard module moves downward for a very short distance and then rebounds quickly. Since the mechanical keyboard is provided with the cushioning material 200, volume of sound that may be generated when the keyboard module rebounds can be reduced.

Figure 5:
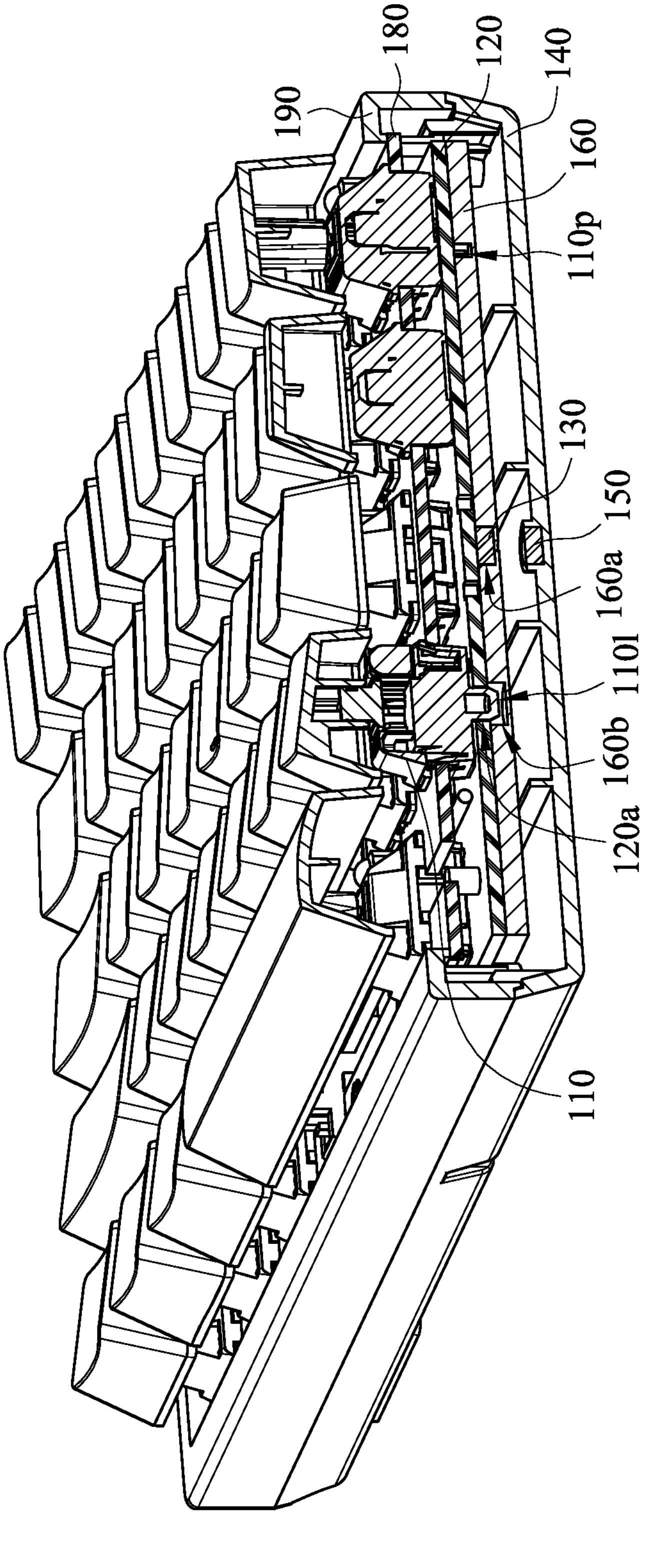
FIG. 5 is a schematic cross-sectional view of a mechanical keyboard according to an embodiment of the present invention.

FIG. 5 is a schematic cross-sectional view of a mechanical keyboard according to an embodiment of the present invention. The difference between the embodiment of FIG. 5 and the embodiment of FIG. 2 is that the mechanical keyboard of the embodiment of FIG. 5 further includes a cover body 160 disposed between the circuit board 120 and the lower casing 140 and fixed on the lower surface of the circuit board 120. The cover body 160 has a plurality of first recesses **160*a* accommodating the first magnetic elements 130, respectively. The cover body 160 may be adhered to the lower surface of the circuit board 120. In some embodiments, an open end of each of the first recesses 160*a* faces the circuit board 120**.

Figure 8:
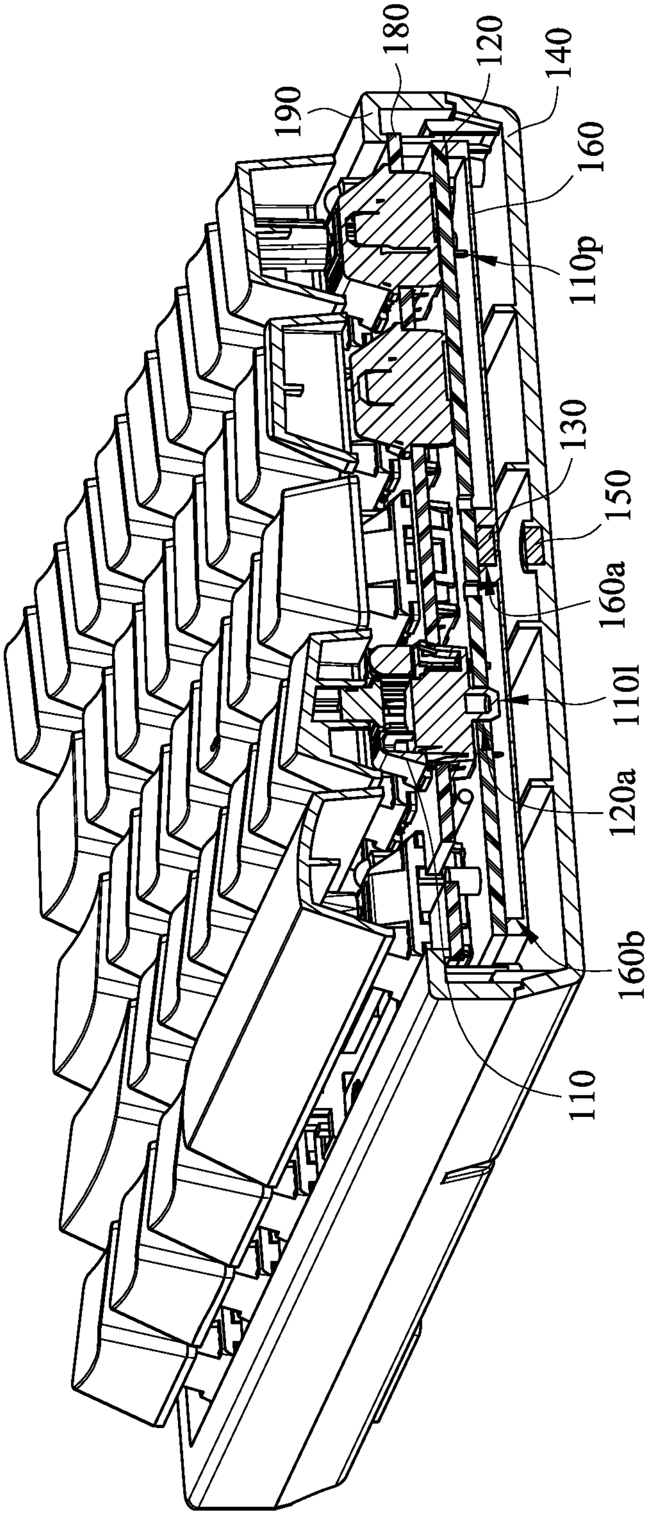
FIG. 8 is a schematic cross-sectional view of a mechanical keyboard according to an embodiment of the present invention.

In some embodiments, the cover body 160 is a cover layer (as shown in FIG. 4) or is composed of a plurality of cover portions (not shown, please refer to FIG. 8). In some embodiments, the cover body is composed of the cover portions, and the cover portions are separated from each other, and each of the cover portions has one of the first recesses **160*a*. In some embodiments, the cover body is composed of the cover portions, and the positioning portion 1101 and/or the pin 110*p* of the mechanical key 110 is exposed from the lower surface of the circuit board 120**.

In some embodiments, as shown in FIG. 5, the cover body 160 further has a second recess **160*b*, which accommodates an end of the positioning portion 1101 of the mechanical key 110. The second recess 160*b* constitutes a small resonance space. In some embodiments, there are a plurality of second recesses 160*b*, and each of the second recesses accommodates one of the ends of the positioning portions 1101 of the mechanical keys 110**.

In some embodiments, compared with a traditional non-floating keyboard module, when the mechanical key 110 of the floating keyboard module shown in FIG. 2 is pressed, resonance produced is small and sound performance is pure. It is because there is no path for sound to be transmitted downwards. The term "sound performance is pure" means that volumes of sounds generated and spectrums of a specific frequency range when keys are pressed are relatively consistent. In some embodiments, compared with the traditional non-floating keyboard module, when the mechanical key 110 of the floating keyboard module shown in FIG. 5 is pressed, resonance produced is much smaller.

Figure 7:
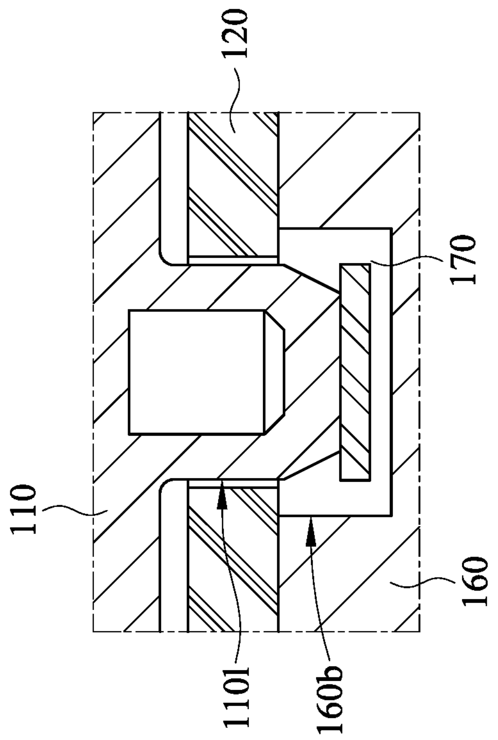
FIG. 7 is a schematic cross-sectional view of a positioning portion, a circuit board, a cover body and an acoustic material of a mechanical key according to an embodiment of the present invention.
Figure 6:
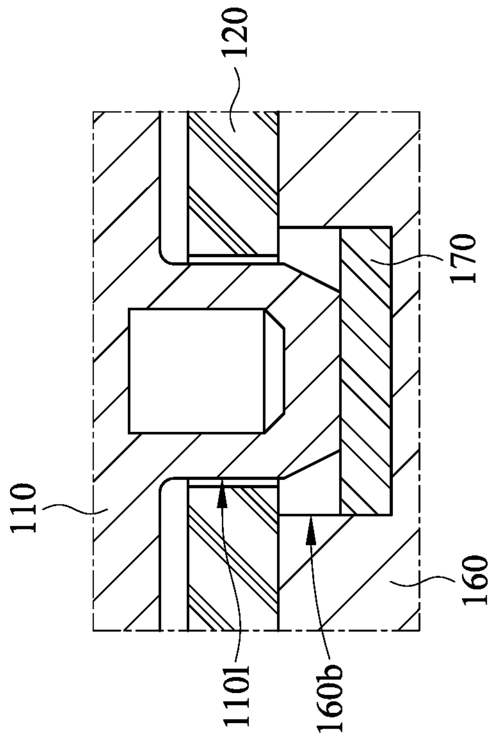
FIG. 6 is a schematic cross-sectional view of a positioning portion, a circuit board, a cover body and an acoustic material of a mechanical key according to an embodiment of the present invention.

FIG. 6 is a schematic cross-sectional view of a positioning portion, a circuit board, a cover body and an acoustic material of a mechanical key according to an embodiment of the present invention. FIG. 7 is a schematic cross-sectional view of a positioning portion, a circuit board, a cover body and an acoustic material of a mechanical key according to an embodiment of the present invention. As shown in FIGS. 6 and 7, the mechanical keyboard further includes an acoustic material 170 disposed in the second recess **160*b* and in contact with the positioning portion 1101. The acoustic material 170 is configured to change the sound performance or to reduce the volume of the sound when the mechanical key 110** is pressed.

In some embodiments, as shown in FIG. 6, the acoustic material 170 is, for example, a sound-absorbing/sound-insulating compressible material, such as foam, rubber, or other suitable materials. In some embodiments, when the mechanical key 110 shown in FIG. 6 is pressed, the volume of the sound generated is small.

In some embodiments, as shown in FIG. 7, the acoustic material 170 is, for example, a rigid material, such as metal, rigid plastic, or other suitable materials. In some embodiments, when the mechanical key 110 shown in FIG. 7 is pressed, high-frequency sound waves appear.

FIG. 8 is a schematic cross-sectional view of a mechanical keyboard according to an embodiment of the present invention. The difference between the embodiment of FIG. 8 and the embodiment of FIG. 5 is that the second recess **160*b* of the embodiment of FIG. 8 can accommodate the ends of the positioning portions 1101 of the mechanical keys 110. The second recess 160*b* forms a large resonance space. In some embodiments, please refer to FIG. 8, the mechanical keyboard further includes an acoustic material (not shown), which is disposed in the second recess 160*b* to change the sound performance or reduce the volume of the sound when the mechanical key 110** is pressed. In some embodiments, the acoustic material is foam, rubber, metal, rigid plastic, or other suitable materials.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A mechanical keyboard having a key region and an edge region surrounding the key region, comprising:

- a plurality of mechanical keys, located in the key region;
- a circuit board, disposed beneath the mechanical keys;
- a plurality of first magnetic elements, disposed beneath the circuit board and distributed in the key region;
- a lower casing, disposed beneath the mechanical keys, the circuit board and the first magnetic elements; and
- a plurality of second magnetic elements, disposed over the lower casing, wherein the second magnetic elements respectively correspond to the first magnetic elements and respectively repel the first magnetic elements.

2. The mechanical keyboard of claim 1, wherein there is no magnetic element located in the edge region.

3. The mechanical keyboard of claim 1, wherein vertical projections of the first magnetic elements are staggered from vertical projections of the mechanical keys, and the vertical projection of at least one of the first magnetic elements is between the vertical projections of two of the mechanical keys.

4. The mechanical keyboard of claim 1, wherein the first magnetic elements are fixed on a lower surface of the circuit board.

5. The mechanical keyboard of claim 1, further comprising:

a cover body, disposed between the circuit board and the lower casing, and fixed on a lower surface of the circuit board, wherein the cover body has a plurality of first recesses respectively accommodating the first magnetic elements.

6. The mechanical keyboard of claim 5, wherein the cover body is a cover layer or is composed of a plurality of cover portions.

7. The mechanical keyboard of claim 6, wherein the cover body is composed of the cover portions, and each of the cover portions has one of the first recesses.

8. The mechanical keyboard of claim 5, wherein an open end of each of the first recesses faces the circuit board.

9. The mechanical keyboard of claim 5, wherein one of the mechanical keys has a positioning portion protruding downward from a lower surface of the mechanical key, and the circuit board has a first opening, and the positioning portion is through the first opening, and the cover body further has a second recess accommodating an end of the positioning portion.

10. The mechanical keyboard of claim 9, further comprising:

an acoustic material, disposed in the second recess and in contact with the positioning portion.

11. The mechanical keyboard of claim 1, wherein at least one of the first magnetic elements and the second magnetic elements is an electromagnet.

* * * * *